United States Patent [19]

Adams

[11] Patent Number: 5,725,193
[45] Date of Patent: Mar. 10, 1998

[54] CHRISTMAS TREE STAND

[75] Inventor: William E. Adams, Portersville, Pa.

[73] Assignee: Adams Mfg. Corp., Portersville, Pa.

[21] Appl. No.: 585,092

[22] Filed: Jan. 16, 1996

[51] Int. Cl.$^6$ .............................. A47G 33/12; A01G 9/12
[52] U.S. Cl. ............... 248/523; 248/524; 248/529; 47/405
[58] Field of Search .................. 47/405; 248/519, 248/523, 524, 527, 529, 188.7

[56] References Cited

U.S. PATENT DOCUMENTS

| | | | |
|---|---|---|---|
| 1,298,380 | 3/1919 | Owen | 248/523 |
| 1,570,403 | 1/1926 | Ripczinske | |
| 2,237,513 | 4/1941 | Tiamko | 248/523 |
| 2,500,215 | 3/1950 | Swearingen | |
| 2,617,617 | 11/1952 | Krastel et al. | |
| 2,855,168 | 10/1958 | Vigua | 47/40.5 |
| 2,938,304 | 5/1960 | Thomas et al. | |
| 3,119,585 | 1/1964 | Austenson | |
| 3,484,067 | 12/1969 | Fulper | |
| 4,261,138 | 4/1981 | St George Syms | 248/523 X |
| 4,286,409 | 9/1981 | Taylor et al. | 47/40.5 |
| 4,399,973 | 8/1983 | Spry et al. | |
| 4,436,272 | 3/1984 | Lile et al. | |
| 4,565,028 | 1/1986 | Stephan | 248/524 X |
| 4,967,508 | 11/1990 | Reynolds | 248/523 X |
| 5,014,461 | 5/1991 | Vom Braucke et al. | 248/523 X |
| 5,074,514 | 12/1991 | Smith | 47/40.5 X |
| 5,157,868 | 10/1992 | Munoz | |
| 5,249,772 | 10/1993 | Montie, Jr. et al. | |
| 5,478,042 | 12/1995 | Bliss et al. | 248/523 |
| 5,484,131 | 1/1996 | Aldrele et al. | 248/527 |

OTHER PUBLICATIONS

Catalogue entitled "Country Holidays Lites Up." 1996, Gary Products Group, Inc.

*Primary Examiner*—Robert Canfield
*Attorney, Agent, or Firm*—Buchanan Ingersoll, P.C.

[57] ABSTRACT

A compact tree stand has a generally cylindrical container having an open top, closed bottom and a wall extending therebetween which together define a central cavity. A plurality of legs are releasably attached to the exterior of the container and may be interconnected by braces. The cavity and the legs are sized so that the diameter of the cavity is greater than the height of the legs half the length of each leg is less than the depth of the cavity. This enables the legs to be nested within the cavity so that the tree stand can be placed in a relatively small box for shipment and sale. An inner cup can be placed within the cavity and may rotate relative to the container. Stepped ribs or an insert having a conical cavity may be placed within the inner cup or the container to enable the tree stand to hold artificial trees having different trunk diameters. A water reservoir is preferably attached to the container and legs. A wick and water retaining pad may also be provided.

23 Claims, 7 Drawing Sheets

13 5,725,193

CHRISTMAS TREE STAND

FIELD OF INVENTION

The present invention relates to a Christmas tree stand which will hold both artificial and live trees.

DESCRIPTION OF THE PRIOR ART

A wide variety of Christmas tree stands have been developed in the art. One type of tree stand has a generally hemispheric or frusto-conical configuration. An opening is provided in the top to accommodate the tree trunk. Either the entire stand or a cup placed within the stand is filled with water. Typically, three or more screws are provided around the opening to secure the tree trunk to the base. Examples of this type of tree stand are shown in U.S. Pat. Nos. 1,570,403; 4,399,973 and 5,249,772.

Another type of tree stand is comprised of a cup or pan into which the tree trunk is placed. Three or four legs extend radially from the pan. Screws or clamps are provided to hold the tree trunk in the stand. Examples of this type of tree stand are shown in U.S. Pat. Nos. 2,500,215; 2,617,617; 3,119,585; 3,484,067 and 4,433,272. These stands typically are metal and have a tendency to rust.

In order to provide a stable support for the Christmas tree, the base must be over twelve inches and typically as much as twenty-four inches in diameter. Consequently, these Christmas tree stands take a significant amount of shelf space. The one piece hemispherical or frusto-conical tree stands are typically made of molded plastic and are not individually boxed for sale. Consequently, the tree stands are difficult to stack in the retail store. Because of the difficulty in displaying Christmas tree stands and the amount of shelf space they require, retailers often will order a smaller quantity of tree stands than they can sell or offer only one or two different tree stands. There is a need for a Christmas tree stand that can be packaged in such a way as to require only small amount of retail shelf space. Moreover, the Christmas tree stand should be packaged in such a way that several stands can be stacked one on top of another.

Most of the tree stands presently available for individual purchase in the marketplace are designed for live trees. Artificial trees are typically sold with a stand. However, there are a few replacement tree stands available for purchase separate and apart from purchase of an artificial tree. These artificial tree stands are designed to hold only artificial trees. The trunk of an artificial tree typically is from 1 to 3 inches in diameter whereas the trunks of most live Christmas trees are over 3 inches in diameter. Therefore, a tree stand sold for use with an artificial tree cannot be used for a live tree and most live tree stands have a cavity that is too big for an artificial tree trunk. Since many purchasers buy both artificial and live trees, there is a need for a Christmas tree stand that can be used for both types of trees.

After a Christmas tree has been placed in a tree stand of the prior art it is difficult to rotate the tree. Often this cannot be done without also moving the stand. Since many people want to turn their tree after it is placed in the stand, there is a need for a tree stand which permits easy rotation of a tree placed therein.

There has also been proposed a number of systems for watering Christmas trees from an outside reservoir. Typically, this is done through the use of gravity flow or siphon. In U.S. Pat. No. 5,157,868, Munoz discloses a passive Christmas Tree Waterer and Monitor wherein water is placed in a container separate from the tree stand. A siphon action is used to deliver water from the reservoir to a tree stand. It is advantageous to offer such a watering device with a tree stand. That device should be positioned and configured to increase the stability of the tree stand.

SUMMARY OF THE INVENTION

I provide a Christmas tree stand having a cup shaped container into which the tree trunk is placed. A plurality of slots is placed on the exterior of the container to receive radially extending legs. The inside diameter of the container and the height of the legs are sized so that the legs can be nested within the container for shipment. Screws are fitted through slots along the top lip of the container to secure a tree trunk to the tree stand. Preferably, a gripper is provided at the end of each screw. The gripper is constructed and attached in such a manner so that it can pivot relative to the screw and conform to the exterior surface of the tree trunk. This also allows the screws to hold the thinner trunks of artificial trees.

I also prefer to provide triangular pads at the distal end of the tree stand legs to improve stability. An optional brace which interconnects the legs may also be used to improve stability.

I prefer to provide one or two inner cups which fit within the container. One inner cup is sized to have a tapered or step-like inner surface to accommodate tree trunks of different diameters. Preferably, the cup rests on ridges provided in the bottom of the container. Consequently, when a tree is placed within the inner cup one can rotate the tree relative to the tree stand because the inner cup will slide across the ribs. I further prefer to perforate the inner cup to allow water to pass into the inner cup from the container.

I further prefer to provide an on site water reservoir connected to the container by a fill tube. Preferably, the fill tube contains a wick and a water retaining pad is provided at the base of the container. The water retaining pad assures that the entire bottom of the tree trunk is in contact with water at all times.

Other objects and advantages of the present invention will become apparent from a description of the preferred embodiments shown in the accompanying drawings.

DESCRIPTION OF THE PREFERRED EMBODIMENTS

Figure 1:
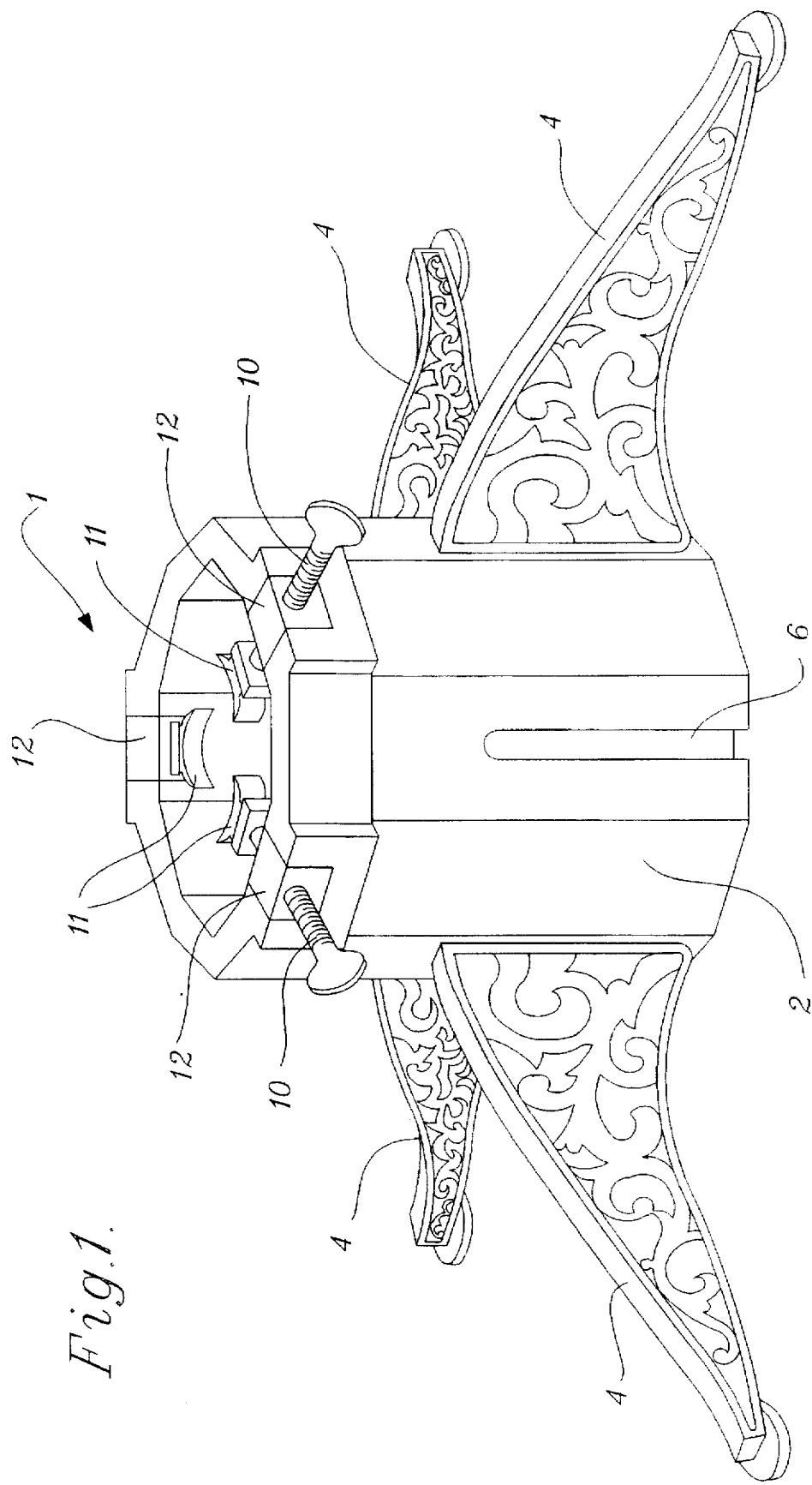
FIG. 1 is a perspective view of the present preferred embodiment of my tree stand with one leg removed.
Figure 2:
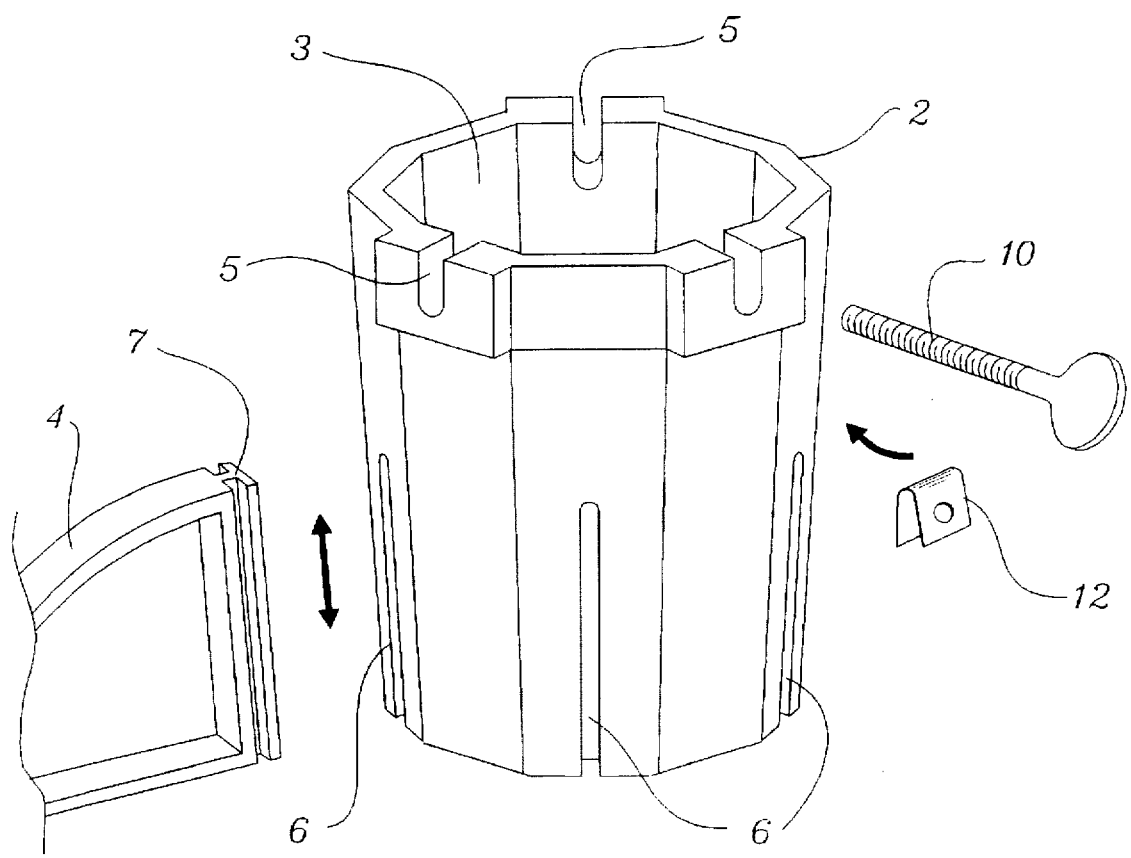
FIG. 2 is a perspective view illustrating how the legs and screws are attached to container.
Figure 3:
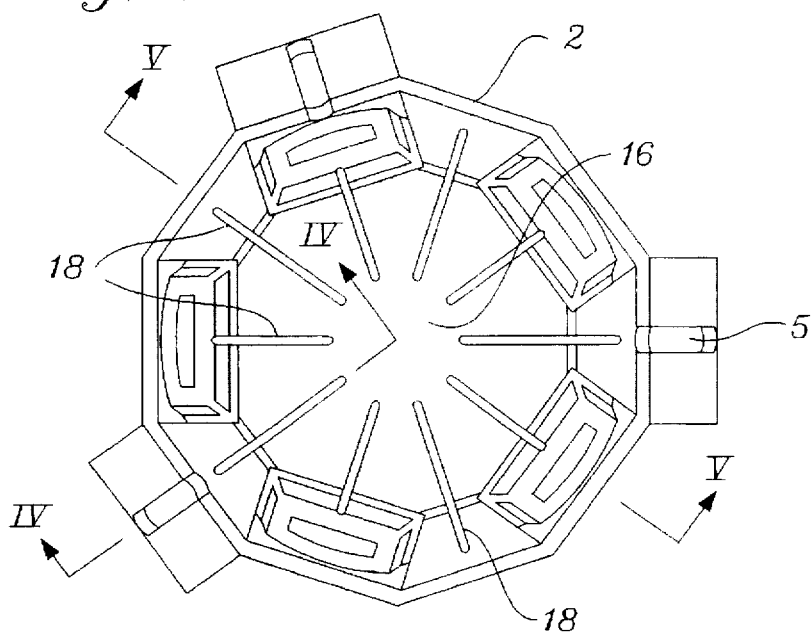
FIG. 3 is a top plan view of the container portion of the tree stand.
Figure 4:
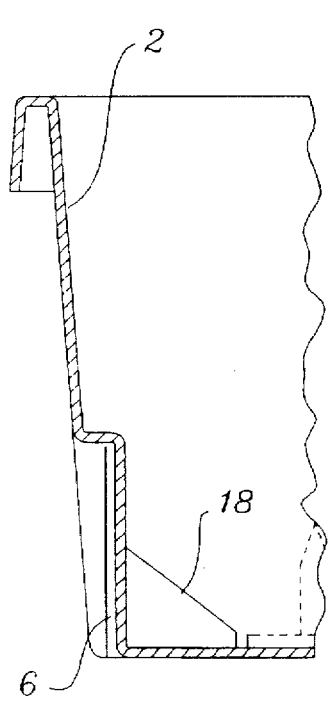
FIG. 4 is a perspective view taken along the line IV—IV of FIG. 3.
Figure 5:
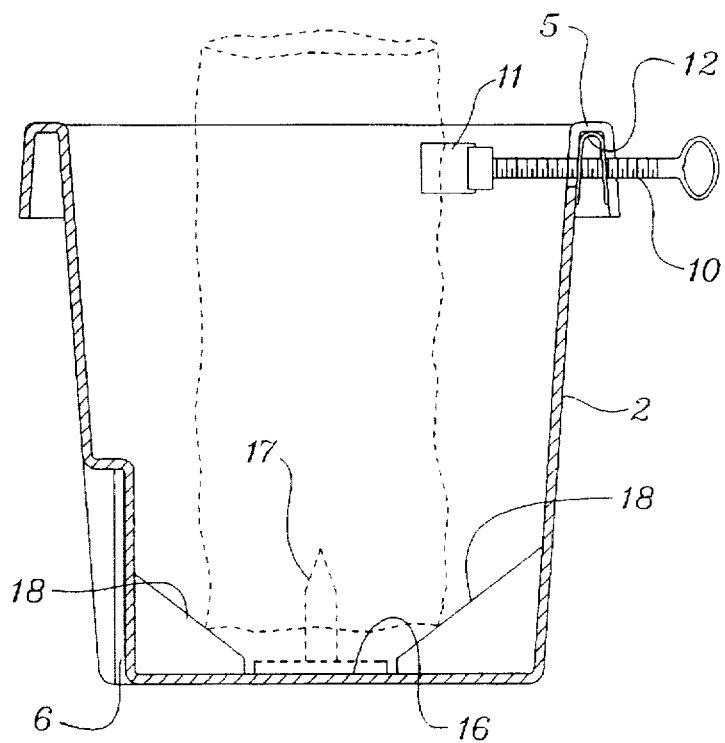
FIG. 5 is a cross-sectional view taken along the line V—V of FIG. 3.

A first present preferred embodiment of my tree stand 1 is shown in FIGS. 1 thru 5. The tree stand is comprised of a cup shaped container 2 to which five radially extending legs 4 are attached. Both the container and the cup are preferably molded plastic. A filigree is provided in the legs to provide a decorative appearance and reduce the amount of plastic required for the legs without reducing strength. The container 2 is generally cylindrical having an open top, closed bottom and central cavity 3, sized to hold the bottom of a tree trunk. As can be seen most clearly in FIG. 2 the legs are provided with a key 7 which fits into a receptacle such as slot 6 provided on the exterior of cup 2. Moreover, the receptacles could be provided in the legs and the keys may be on the container. If desired a swiveling ball and socket, or hinges, or interlocking tabs or other connectors could be used to or removably attach the legs to the container. Three or more hand screws 10 extend through top slots 5. A metal insert 12 preferably is fitted within the slot to retain the screw 10. I prefer to provide a gripper 11 shown more clearly in FIG. 6 on the end of each hand screw 10. I prefer to provide a plurality of radially extending ridges 18 within the container 2 as shown in FIGS. 3 and 5. The trunk of the Christmas tree 15 shown in chainline in FIG. 5 rests upon the ridges 18 so that the bottom of the trunk is maintained at some distance from the bottom 16 of the container 2 to allow water to come in contact with the trunk. Optionally, I provide a spike 17 attached to the bottom 16 of container 2. As shown in FIG. 5, the spike penetrates into the bottom of the trunk to further secure the trunk in the tree stand. A hard plastic cone (not shown) may be used in place of spike 17.

Figure 6:
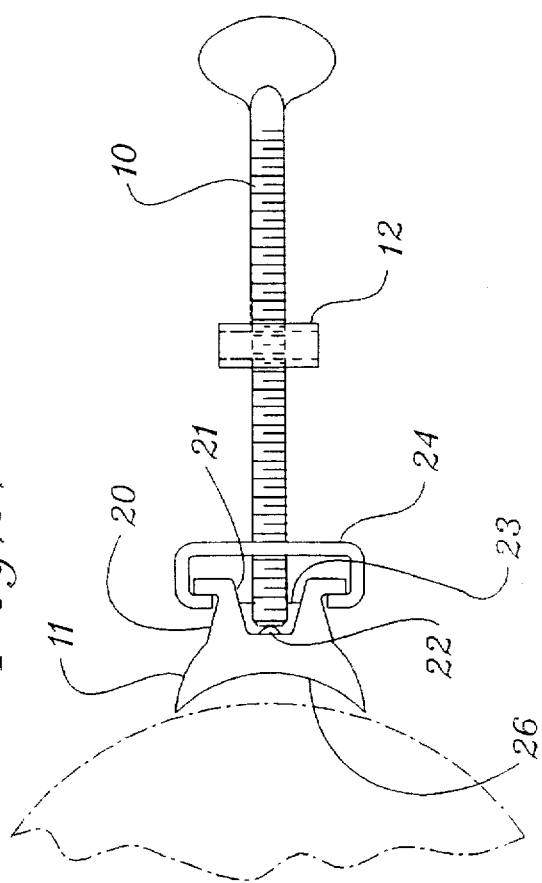
FIG. 6 is a top plan view partially of a section of a present preferred gripper.
Figure 7:
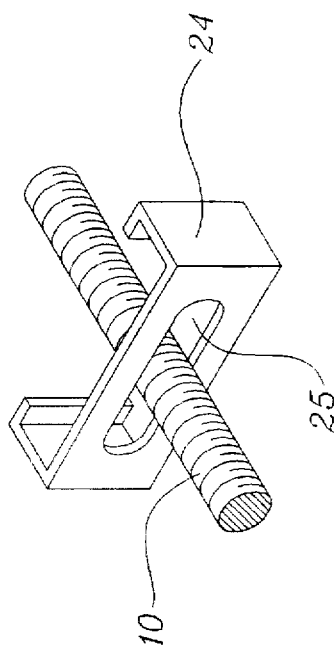
FIG. 7 is a perspective view showing the retainer used on the gripper.

As can be seen in FIGS. 6 and 7 the present preferred gripper 11 has a curved inner surface 26 which will abut the exterior of the tree placed within the stand. A collar 20 extends from the outer surface of the gripper 11. The collar has a tapered inner surface 21 and a dimple 22 at the base. A retainer 24 fits over the collar as shown in FIG. 6. The hand screw 10 extends through slot 25 in the retainer and abuts dimple 22. Dimple 22 enables the gripper 11 to pivot relative to the hand screw 10 so as to better conform with the outer surface of the tree trunk even if the tree is placed off center within the container 2. In addition to or in place of retainer 24, I may provide a single thread 23 on the inside of the collar. Hand screw 10 would be initially threaded into threads 23. In the event that the gripper 11 pivots relative to the hand screw 10 threads 23 would break or bend to allow pivoting. The head of the hand screw may have a molded snap on or molded in decoration to improve leverage and make it more attractive.

Figure 8:
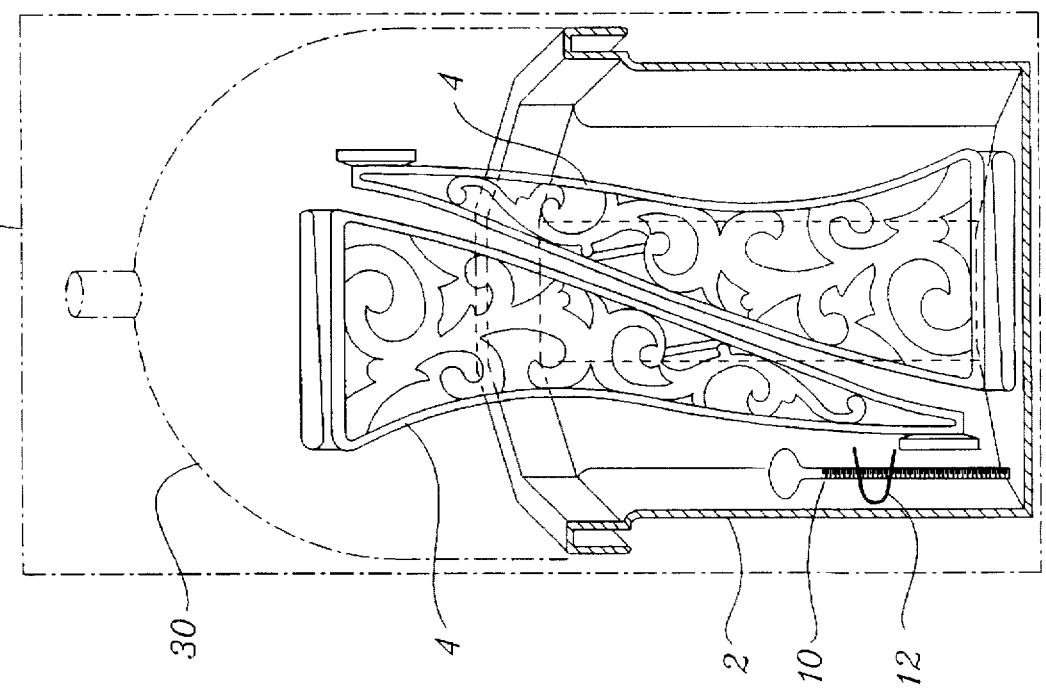
FIG. 8 is a side view partially in section showing a tree stand packed for shipment.
Figure 13:
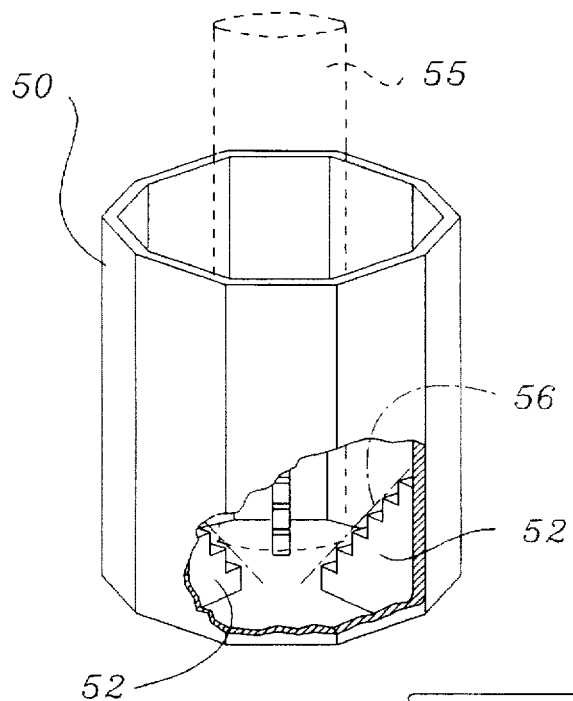
FIG. 13 is a perspective view of a present preferred inner cup partially cut away.
Figure 14:
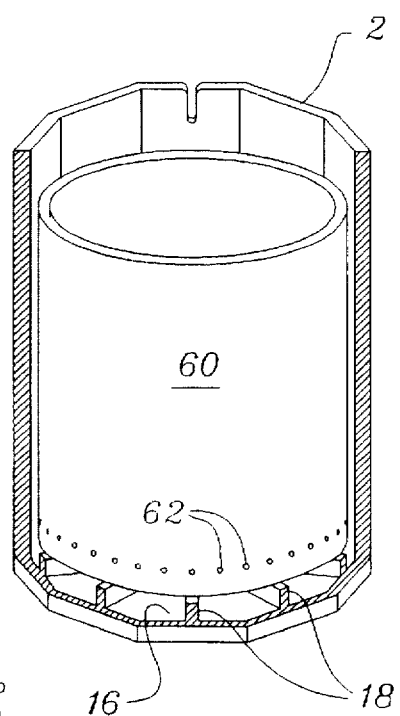
FIG. 14 is a perspective view of a second preferred inner cup placed within the container of the tree stand.

My tree stand can be compactly packed as shown in FIG. 8. The legs 4 are nested within container 2. Hand screws 10 each with an insert 12 and gripper 11 attached are placed within the container. A cover 30 which preferably is the water filling device shown in FIG. 8, or an inner cup such as shown in FIGS. 13 and 14, fits over the top of container 2. This entire assembly can then be placed within a relatively small cardboard box indicated by chainline 29 shown in FIG. 8. The legs and container are partially sized so that the entire tree stand will fit in a box having a seven inch square base and twelve inch height. A dozen or other selected quantity of these boxes are then placed in a shipping container. At the store they can easily be stacked on a shelf. The present preferred embodiment is sized such that the cup 2 is faceted and has a height of 7.1875 inches, an outside diameter of approximately 8.125 inches and a bottom diameter of 6.15 inches. The wall thickness of the container is preferably 0.125 inches. Therefore, the cavity 3 has a depth of about 7 inches and the inner diameter at the base of the cup is approximately 7.875 inches. The key portion 7 of legs 4 is preferably 3 inches in height. The legs are 10½ inches long. Consequently, the legs will easily nest within the container 2 as shown in FIG. 8. Because the length of the legs is not greater than half the depth of cavity 3, the legs can be packed n the container so that the packed combination will not easily tip over.

Figure 10:
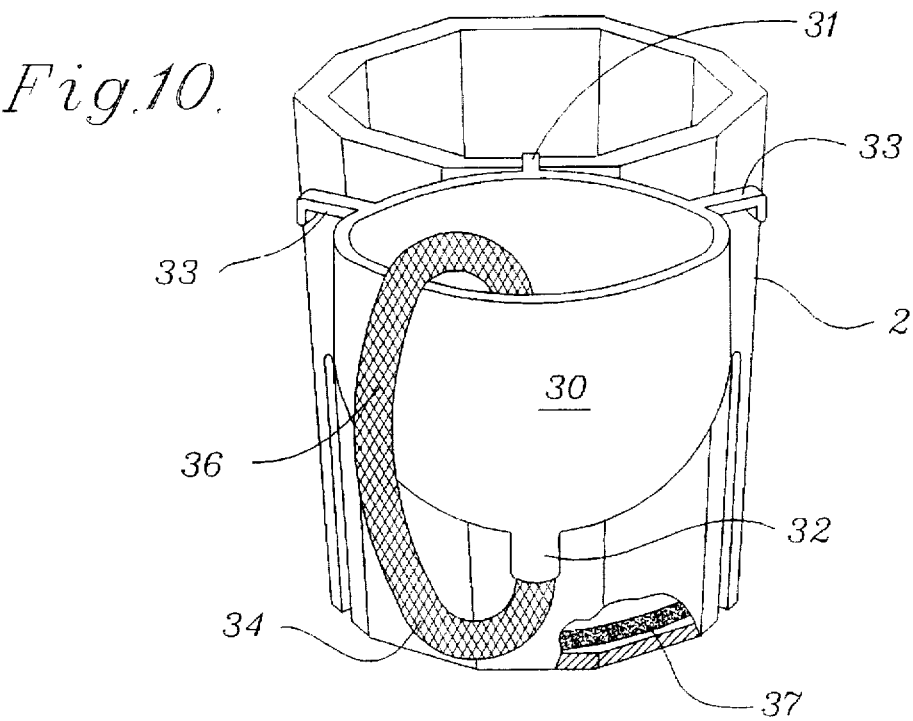
FIG. 10 is a side view showing the watering system attached to the tree stand.
Figure 11:
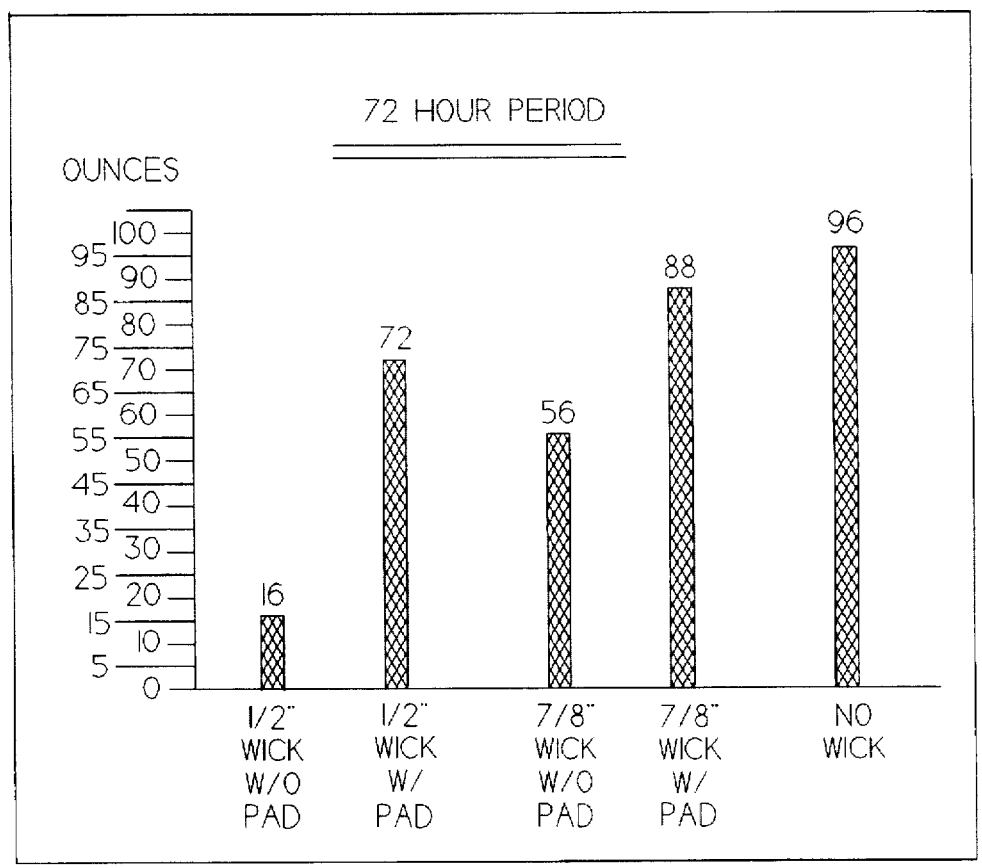
FIG. 11 is a graph showing water usage.
Figure 9:
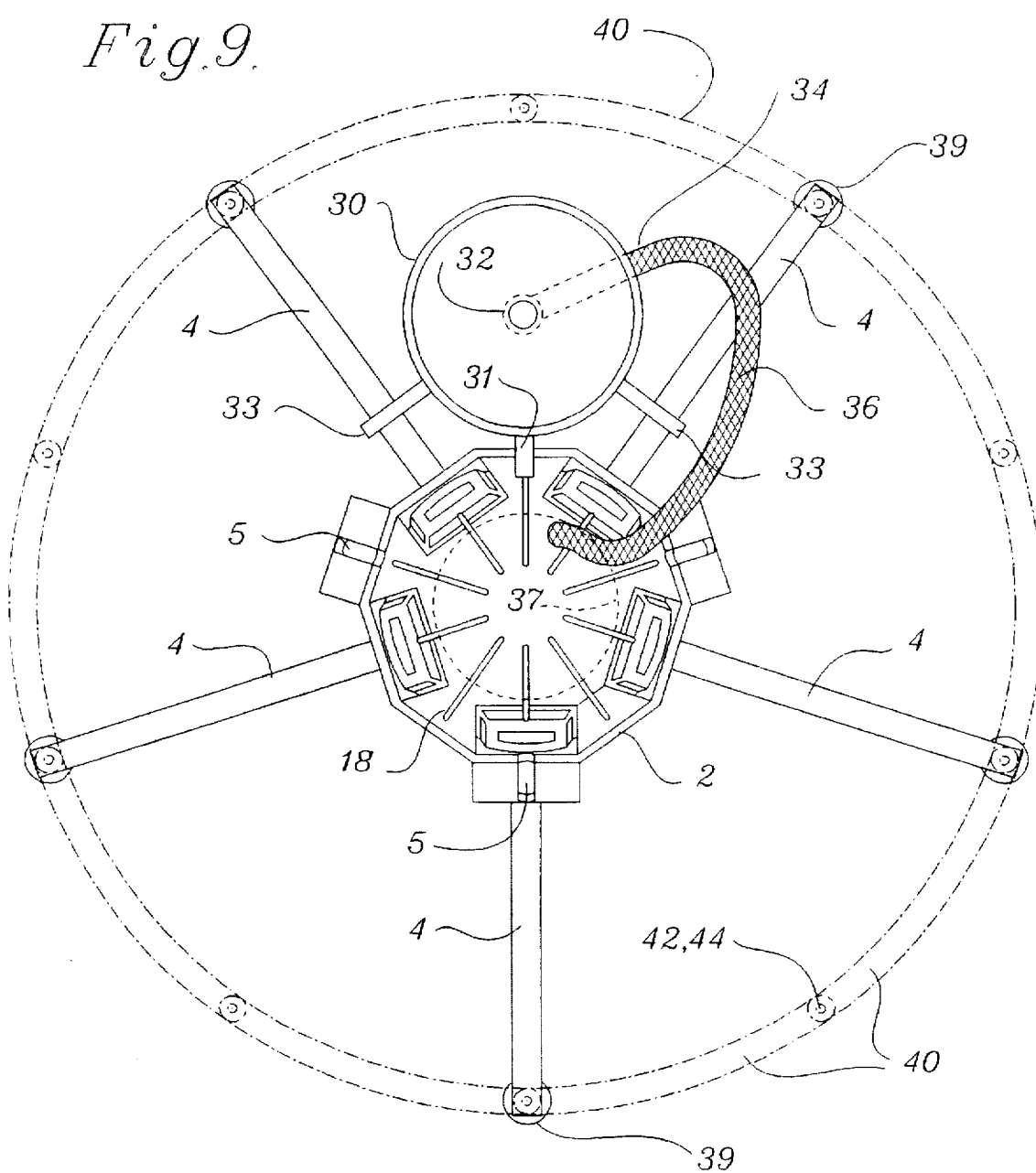
FIG. 9 is a top plan view of my tree stand with a stabilizing brace and watering system.

I also prefer to provide a watering system for my tree stand shown in FIGS. 9 and 10. A reservoir 30 preferably shaped like a funnel is hung on the exterior of the container 2 by bracket 31. The reservoir may also or alternatively be fastened to two adjacent legs by bracket 33. Attachment to the legs can improve the stability of the tree stand. The reservoir preferably has an outside diameter and is shaped to fit over the container 2 when not in use as shown in FIG. 8. Reservoir 30 is funnel-shaped so that water will flow through output end 32 into tube 34 and into the container. The tube may be placed over the container 2 as shown in FIG. 10, or a fitting (not shown) can be provided to connect the tube through the side of the container. Water may flow through a siphon action initiated by lifting the water filled reservoir 30 above the container 2. An alternative method of supplying water is to provide a wick 36 within tube 34 and a water retaining pad 37 in the base of the container 2. The pad has the advantage of conforming to the bottom surface of the tree trunk to ensure that water is delivered to all of the water capillaries within the tree trunk. I compared the water usage of the tree placed in the container with and without the pad and wick. The results of that test in which two sizes of wicks were used are shown in the graph of FIG. 11.

Figure 12:
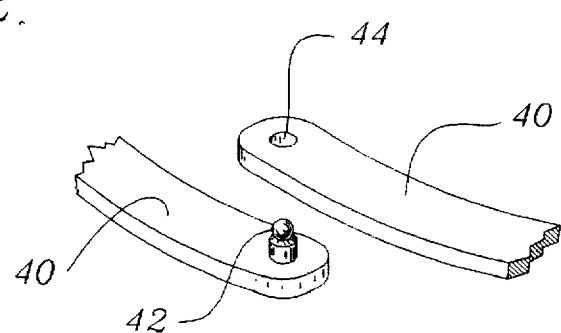
FIG. 12 is a fragmentary view showing how the brace is assembled.

I prefer to provide triangular shaped pads 39 at the distal ends of the legs 4 for better stability. I found that the stability of my tree stand can be increased by connecting the legs 4 together as shown in FIG. 9. Preferably, I provide a connecting ring consisting of a plurality of braces 40 connected together. The braces are shaped as shown in FIG. 12 to have a tab 42 at one end that fits into a hole 44 at the opposite end of the brace. The braces can be attached through a hole in the end of each leg in a similar manner. The brace can be made of plastic and easily snapped together and taken apart. One could use string or wire rather than the plastic brace to tie the legs together and keep the legs in tension, thereby providing a stronger base.

Figure 15:
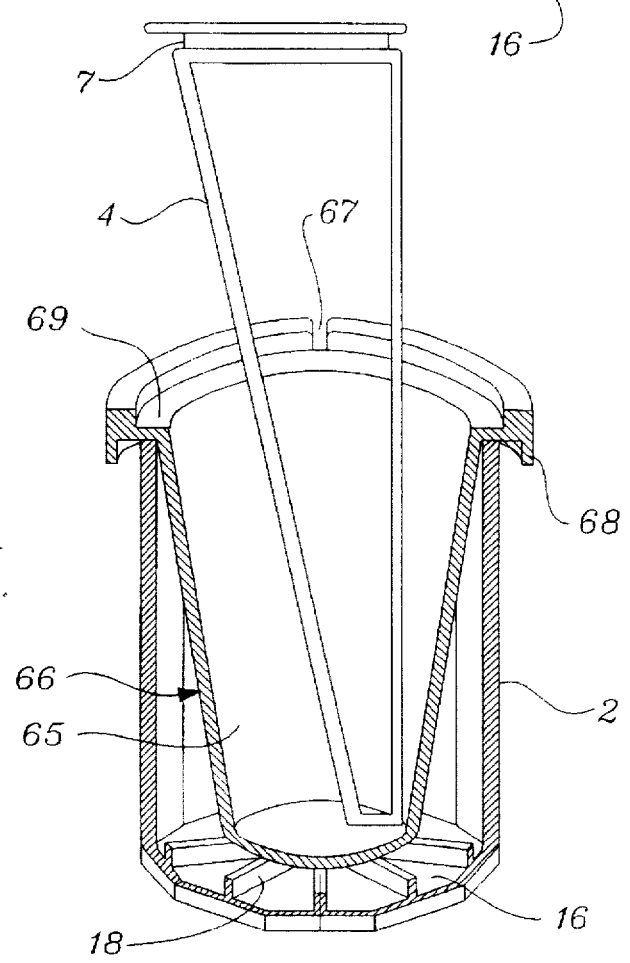
FIG. 15 is a perspective view of a third preferred inner cup placed within the container of the tree stand.

I prefer to provide an inner cup for the tree stand such as shown in FIGS. 13, 14 and 15. The inner cup 50 of FIG. 13 and inner cup 66 of FIG. 15 are designed to receive the trunk 55 of an artificial tree. In the inner cup 50 I prefer to provide a set of radially oriented ribs 52 having a stepped upper surface. The steps are aligned to define diameters of increasing size from the base to the top of the ribs. I prefer that the diameter at the bottom of the cup between the adjacent ribs be 1 1/32 inches. The diameters between steps progressively increase to 1 17/32, 2 1/32, 2 17/32 and 3 1/32 inches. Thus, the openings will accommodate artificial tree thinks of 1, 1.5, 2, 2.5 and 3 inches in diameter. Alternatively, one could provide an insert having a conical cavity as indicated by chainline 56. The insert preferably is made of a resilient material such as foam rubber which will conform to a tree stand placed in cup 50. The ribs or the insert illustrated in inner cup 50 could be enlarged and placed directly in container 2.

Inner cup 60 shown in FIG. 14 is intended for use with live trees. The cup 60 rests upon ridges 18 provided on the bottom surface 16 of container 2. Holes 62 are preferably provided in the base of the inner cup 60 to permit water to flow from the container into the inner cup. Alternatively, a knock out can be used rather than the holes. When a tree is placed within the inner cup one can easily rotate the tree relative to the base because inner cup 60 will easily move across the top of ridges 18.

A third preferred inner cup 66 is shown in FIG. 15. That cup has a tapered main body 65 and a flange 68 which fits over the top of container 2. The body 65 can be sized so that the cup rests and rotates on bottom ridges 18 or on the top of the container. Another option is to provide an inner shoulder on the top of container 2. The inner cup 65 is then provided with a mating outer shoulder or flange. A tree stand with this inner cup would be packed as shown in FIG. 14. There the narrow end of the leg would be placed in the bottom of the inner cup 66. The inner cup 66 is sized so that slots 67 can be provided to receive the hand screws, inserts and grippers 10, 11 and 12. Furthermore, an inner shoulder 69 may be provided so that the inner cup can be inverted and fitted over the container 2 for shipment. If that is done the legs when packed would be oriented so that the key 7 of each leg is at the bottom of the container 2 and the narrow end of the leg 4 extends up.

Although I have shown several present preferred embodiments of my tree stand it is to be distinctly understood that my invention is not limited thereto, but may be variously embodied within the scope of the following claims.

I claim:

1. A tree stand comprising:
   a. a generally cylindrical container having an open top, closed bottom and a wall extending therebetween which together define a central cavity having a cavity diameter and sized to receive a tree trunk, the container also having a plurality of container connectors on an exterior surface thereof, the connectors being sized and configured to releasably receive one end of a leg;
   b. a plurality of tree trunk holders attached to the container near the open top;
   c. a plurality of legs, one for each container connector, the plurality of legs sized and configured so that all of the legs can be placed in the container for storage and shipping, each leg having a first end releasably attached to a container connector, the first end having a height which is not greater than the diameter of the container cavity and a length half of which is less than the depth of the cavity; and
   d. an inner cup placed within the cavity of the container and having a diameter sized to receive the tree trunk.

2. The tree stand of claim 1 also comprising a triangular pad attached to each leg on an end of the leg which is furthest away from the first end of the leg.

3. The tree stand of claim 1 also comprised of a plurality of ridges oriented radially within the container and attached to the bottom of the container.

4. The tree stand of claim 3 wherein the ridges extend toward the open top and have a top surface shaped to define cross sectional open areas of increasing diameter.

5. The tree stand of claim 4 wherein the top surfaces of the ridges are stepped.

6. The tree stand of claim 3 wherein the inner cup rests on the ridges.

7. The tree stand of claim 1 wherein the inner cup has a top flange which rests upon the container adjacent the open top.

8. The tree stand of claim 1 wherein the inner cup has one of holes and knockouts.

9. The tree stand of claim 1 also comprising a plurality of ribs oriented radially within the inner cup.

10. The tree stand of claim 9 wherein the ribs extend toward the open top and have a top surface shaped to define cross sectional open areas of increasing diameter.

11. The tree stand of claim 10 wherein the top surfaces of the ribs are stepped.

12. The tree stand of claim 1 wherein the inner cup and container have mating shoulders.

13. The tree stand of claim 1 also comprising a water retaining pad placed in the bottom of the container.

14. The tree stand of claim 1 also comprising:
   a. a water reservoir having an input and an output;
   b. a tube extending from the water reservoir output to the cavity of the container; and
   c. at least one connector attached to the water reservoir and to one of the container and the legs.

15. The tree stand of claim 14 also comprising a wick within the tube.

16. The tree stand of claim 1 wherein each of the legs and the container are releasably attached through a key and slot.

17. The tree stand of claim 1 wherein the tree trunk holders are hand screws and also comprised of a gripper attached to each hand screw.

18. The tree stand of claim 17 also comprising a retainer which engages the hand screw and is attached to the gripper.

19. A tree stand comprising:
   a. a generally cylindrical container having an open top, closed bottom and a wall extending therebetween which together define a central cavity having a cavity diameter and sized to receive a tree trunk, the container also having a plurality of container connectors on an exterior surface thereof, the connectors being sized and configured to releasably receive one end of a leg;
   b. a plurality of tree trunk holders attached to the container near the open top, said tree trunk holders being hand screws;
   c. a plurality of legs, one for each container connector, the plurality of legs sized and configured so that all of the legs can be placed in the container for storage and shipping, each leg having a first end sized and configured to be releasably attached to a container connector, the first end having a height which is not greater than the diameter of the container cavity and a length half of which is less than the depth of the cavity; and
   d. a gripper attached to each hand screw, said gripper having a curved inner surface, a collar which encircles each hand screw and a dimple within the collar against which each hand screw rests and pivots.

20. The tree stand of claim 19 also comprising at least one thread on the collar into which the hand screw is threaded.

21. A tree stand comprising:
   a. a generally cylindrical container having an open top, closed bottom and a wall extending therebetween which together define a central cavity having a cavity diameter and sized to receive a tree trunk, the container also having a plurality of container connectors on an exterior surface thereof, the connectors being sized and configured to releasably receive one end of a leg;

b. a plurality of tree trunk holders attached to the container near the open top;

c. a plurality of legs, one for each container connector, the plurality of legs sized and configured so that all of the legs can be placed in the container for storage and shipping each leg having a first end sized and configured to be releasably attached to a container connector, the first end and an end opposite the first end both having a height which is not greater than the diameter of the container cavity; and d. an inner cup placed within the cavity of the container and having a diameter sized to receive the tree trunk.

22. A tree stand assembly comprising:

a. a generally cylindrical container having an open top, closed bottom and a wall extending therebetween which together define a central cavity having a cavity diameter and sized to receive a tree trunk, the container also having a plurality of container connectors on an exterior surface thereof, the connectors being sized and configured to releasably receive one end of a leg;

b. a plurality of tree trunk holders attached to the container near the open top;

c. a plurality of legs, one for each container connector, the plurality of legs sized and configured so that all of the legs can be placed in the container for storage and shipping, each leg having a first end releasably attached to one of the connectors, the first end having a height which is not greater than the diameter of the container cavity and a length half of which is less than the depth of the cavity; and d. a brace adapted to encircle the container and releasably connected to the legs.

23. The tree stand of claim 22 wherein the brace applies tension on the legs.

* * * * *